United States Patent
Chen et al.

(10) Patent No.: US 9,374,131 B2
(45) Date of Patent: Jun. 21, 2016

(54) FREQUENCY HOPPING IN A WIRELESS COMMUNICATION NETWORK

(75) Inventors: Wanshi Chen, San Diego, CA (US); Peter Gaal, San Diego, CA (US); Juan Montojo, San Diego, CA (US); Masato Kitazoe, Hachiouji (JP); Saiyiu Duncan Ho, San Diego, CA (US); Nathan E. Tenny, Poway, CA (US)

(73) Assignee: QUALCOMM Incorporated, San Diego, CA (US)

( * ) Notice: Subject to any disclaimer, the term of this patent is extended or adjusted under 35 U.S.C. 154(b) by 793 days.

(21) Appl. No.: 12/621,945

(22) Filed: Nov. 19, 2009

(65) Prior Publication Data

US 2010/0189032 A1    Jul. 29, 2010

Related U.S. Application Data

(60) Provisional application No. 61/147,984, filed on Jan. 28, 2009, provisional application No. 61/148,810, filed on Jan. 30, 2009, provisional application No. 61/149,290, filed on Feb. 2, 2009, provisional application No. 61/149,945, filed on Feb. 4, 2009.

(51) Int. Cl.
*H04B 1/7143* (2011.01)

(52) U.S. Cl.
CPC .................................. *H04B 1/7143* (2013.01)

(58) Field of Classification Search
None
See application file for complete search history.

(56) References Cited

U.S. PATENT DOCUMENTS

| | | | |
|---|---|---|---|
| 2002/0009134 A1* | 1/2002 | Fischel et al. | 375/224 |
| 2002/0159403 A1 | 10/2002 | Reddy | |
| 2004/0053615 A1* | 3/2004 | Kim et al. | 455/436 |
| 2005/0041746 A1* | 2/2005 | Rosen et al. | 375/242 |
| 2006/0009227 A1* | 1/2006 | Cudak et al. | 455/450 |

(Continued)

FOREIGN PATENT DOCUMENTS

| | | | |
|---|---|---|---|
| CA | 2675053 A1 | 7/2008 | |
| EP | 1965536 A1 | 9/2008 | |

(Continued)

OTHER PUBLICATIONS

Technical Overview of 3GPP LTE, May 18, 2008, Hyung G. Myung.*

(Continued)

*Primary Examiner* — Ajay Cattungal
*Assistant Examiner* — Gautam Sharma
(74) *Attorney, Agent, or Firm* — Peng Zhu

(57) ABSTRACT

Techniques for performing frequency hopping in a wireless network are described. In an aspect, frequency hopping may be performed based on both cell identity (ID) and system time information. In one design, a user equipment (UE) may determine a cell ID of a cell and may obtain system time information for the cell. The UE may determine resources to use for transmission with frequency hopping based on the cell ID and the system time information. In one design, the UE may initialize a PN generator in each radio frame with an initial value determined based on the cell ID and a system frame number (SFN) for the radio frame. The UE may determine the resources to use for transmission based on a hopping function, a mirroring function, and a PN sequence from the PN generator. The UE may send a transmission on the resources to the cell.

38 Claims, 7 Drawing Sheets

(56) References Cited

U.S. PATENT DOCUMENTS

| | | | |
|---|---|---|---|
| 2007/0129075 A1* | 6/2007 | Kim et al. .................... | 455/436 |
| 2007/0218835 A1* | 9/2007 | Hindelang et al. ................ | 455/8 |
| 2007/0253465 A1* | 11/2007 | Muharemovic et al. ...... | 375/130 |
| 2008/0107087 A1* | 5/2008 | Kwon et al. ................... | 370/335 |
| 2008/0187005 A1* | 8/2008 | Chauviere et al. ............ | 370/480 |
| 2008/0212556 A1* | 9/2008 | Heo et al. ..................... | 370/344 |
| 2009/0082053 A1* | 3/2009 | Wei .................... | H04W 72/082 455/522 |
| 2009/0175230 A1* | 7/2009 | Callard et al. ................ | 370/329 |
| 2009/0257523 A1* | 10/2009 | Varadarajan et al. ......... | 375/295 |
| 2010/0029278 A1* | 2/2010 | Fang et al. .................... | 455/436 |
| 2010/0099431 A1* | 4/2010 | Sampath .............. | H04W 16/16 455/454 |
| 2010/0142467 A1* | 6/2010 | Tiirola et al. ................. | 370/329 |
| 2010/0284363 A1* | 11/2010 | Ahn ..................... | H04B 1/7143 370/330 |
| 2011/0098074 A1* | 4/2011 | Seo et al. ..................... | 455/509 |

FOREIGN PATENT DOCUMENTS

| | | |
|---|---|---|
| JP | 2009535936 A | 10/2009 |
| JP | 2010516156 A | 5/2010 |
| RU | 2325773 C1 | 5/2008 |
| WO | 0115344 A1 | 3/2001 |
| WO | 2005086384 A1 | 9/2005 |
| WO | 2006054825 A2 | 5/2006 |
| WO | WO2007083912 | 7/2007 |
| WO | 2007094628 A1 | 8/2007 |
| WO | 2007127902 A2 | 11/2007 |
| WO | WO2008013404 A1 | 1/2008 |
| WO | 2008084980 A1 | 7/2008 |
| WO | 2008123037 A1 | 10/2008 |
| WO | WO2008137777 | 11/2008 |

OTHER PUBLICATIONS

International Search Report & Written Opinion—PCT/US2009/066403, International Search Authority—European Patent Office—Apr. 1, 2010.

3GPP 36.211, "3rd Generation Partnership Project, Technical Specification Group Radio Access Network, Evolved Universal Terrestrial Radio Access (E-UTRA), Physical Channels and Modulation (Release 8)", 3GPP Standard, 3GPP TS 36.211 V8.5.0, Dec. 1, 2008, pp. 1-82, XP050377537.

3GPP TS 36.213 V8.5.0, "3rd Generation Partnership Project; Technical Specification Group Radio Access Network; Evolved Universal Terrestrial Radio Access (E-UTRA); Physical layer procedures (Release 8)" 3rd Generation Partnership Project (3GPP); TechnicalSpecification (TS), XX, XX, [Online] vol. 36.213, No. TS 36.213 V8.5.0, Dec. 1, 2008, pp. 1-74, XP002572343 Retrieved from the Internet: URL:http://www.3gpp.org/ftp/Specs/archive/ 36_series/36.213/> [retrieved on Feb. 25, 2010].

Taiwan Search Report—TW098146485—TIPO—Apr. 15, 2013.

* cited by examiner

FREQUENCY HOPPING IN A WIRELESS COMMUNICATION NETWORK

The present application claims priority to provisional U.S. Application Ser. No. 61/147,984, filed Jan. 28, 2009, Application Ser. No. 61/148,810 filed Jan. 30, 2009, Application Ser. No. 61/149,290, filed Feb. 2, 2009, and Application Ser. No. 61/149,945, filed Feb. 4, 2009, all entitled "METHOD AND APPARATUS FOR TYPE-2 PUSCH HOPPING IN LTE," and incorporated herein by reference.

BACKGROUND

I. Field

The present disclosure relates generally to communication, and more specifically to techniques for performing frequency hopping in a wireless communication network.

II. Background

Wireless communication networks are widely deployed to provide various communication content such as voice, video, packet data, messaging, broadcast, etc. These wireless networks may be multiple-access networks capable of supporting multiple users by sharing the available network resources. Examples of such multiple-access networks include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

A wireless communication network may include a number of base stations that can support communication for a number of user equipments (UEs). A UE may communicate with a base station via the downlink and uplink. The downlink (or forward link) refers to the communication link from the base station to the UE, and the uplink (or reverse link) refers to the communication link from the UE to the base station. The UE may send a transmission of data on resources allocated by the base station to the UE. It may be desirable to send the transmission with frequency hopping to obtain good performance.

SUMMARY

Techniques for performing frequency hopping in a wireless communication network are described herein. In an aspect, frequency hopping may be performed based on a hopping function and both cell identity (ID) and system time information. The system time information may effectively extend the periodicity of the hopping function, which may ensure frequency hopping in various operating scenarios.

In one design, a UE may determine a cell ID of a cell and may obtain system time information for the cell. The system time information may comprise a system frame number (SFN) for a radio frame. The UE may determine resources to use for transmission with frequency hopping based on the cell ID and the system time information. The UE may then send a transmission on the resources to the cell.

In one design, the UE may determine an initial value for each radio frame based on the cell ID and the SFN for that radio frame. The UE may initialize a pseudo-random number (PN) generator in each radio frame with the initial value for that radio frame. The UE may generate a PN sequence in each radio frame with the PN generator. The UE may determine a particular subband to use for transmission based on a hopping function and the PN sequence. The UE may also determine whether or not to use mirroring based on a mirroring function and the PN sequence. The UE may then determine the resources to use for transmission in the particular subband based on whether or not to use mirroring. The PN sequence may be generated in each radio frame based on at least one bit (e.g., two least significant bits (LSBs)) of the SFN. The hopping function and the mirroring function may have a periodicity of at least two (e.g., four) radio frames, even though the PN generator may be initialized in each radio frame.

Various aspects and features of the disclosure are described in further detail below.

DETAILED DESCRIPTION

The techniques described herein may be used for various wireless communication networks such as CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA), Time Division Synchronous CDMA (TD-SCDMA), and other variants of CDMA. cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) and LTE-Advanced (LTE-A) in both frequency division duplexing (FDD) and time division duplexing (TDD) are new releases of UMTS that use E-UTRA, which employs OFDMA on the downlink and SC-FDMA on the uplink. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, certain aspects of the techniques are described below for LTE, and LTE terminology is used in much of the description below.

Figure 1:
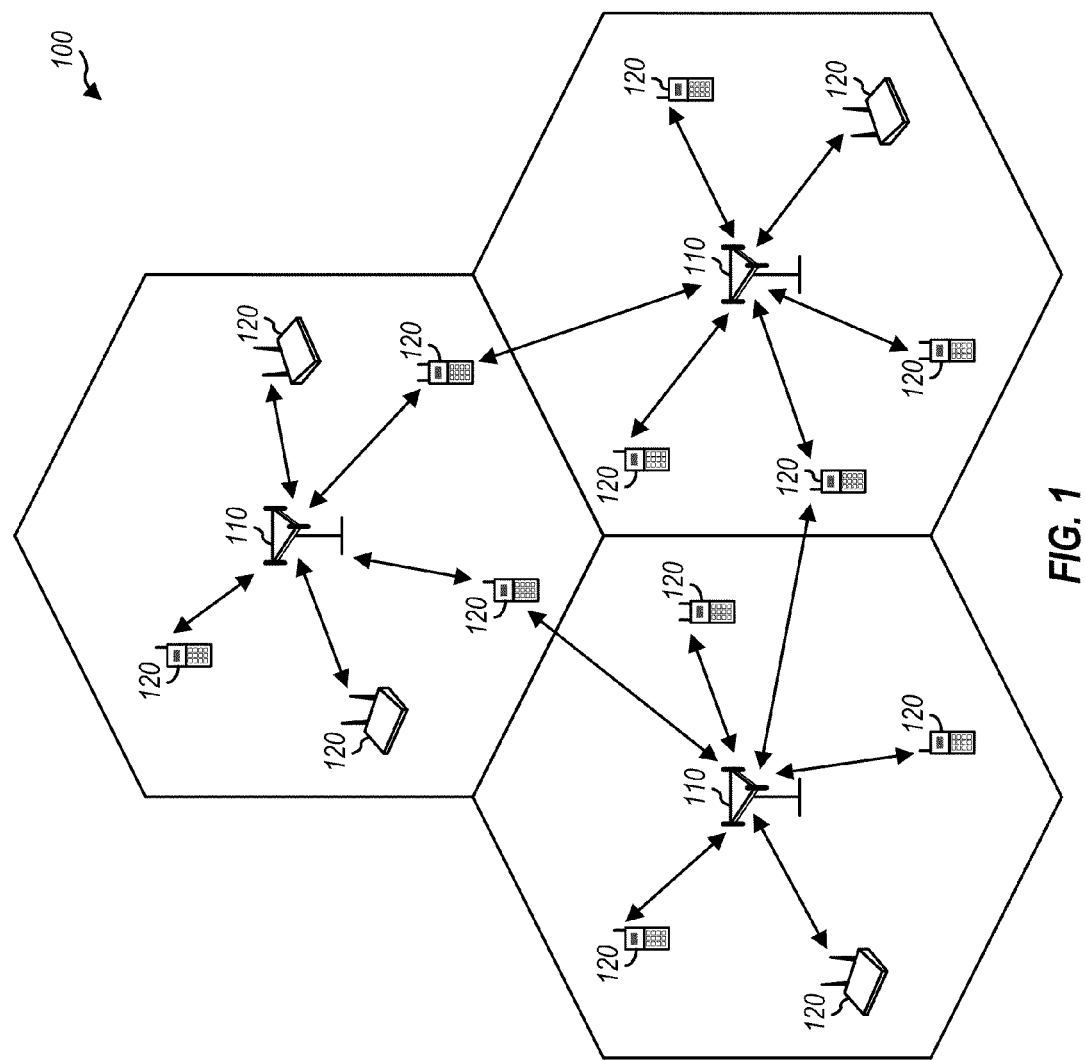
FIG. 1 shows a wireless communication network.

FIG. 1 shows a wireless communication network 100, which may be an LTE network or some other wireless network. Network 100 may include a number of evolved Node Bs (eNBs) 110 and other network entities. An eNB may be a station that communicates with the UEs and may also be referred to as a Node B, a base station, an access point, etc.

Each eNB 110 provides communication coverage for a particular geographic area and supports communication for the UEs located within the coverage area. The term "cell" can refer to a coverage area of an eNB and/or an eNB subsystem serving this coverage area, depending on the context in which the term is used. An eNB may support one or multiple (e.g., three) cells.

UEs 120 may be dispersed throughout the wireless network, and each UE may be stationary or mobile. A UE may also be referred to as a mobile station, a terminal, an access terminal, a subscriber unit, a station, etc. A UE may be a cellular phone, a personal digital assistant (PDA), a wireless modem, a wireless communication device, a handheld device, a laptop computer, a cordless phone, a wireless local loop (WLL) station, a smart phone, a netbook, a smartbook, etc.

Figure 2:
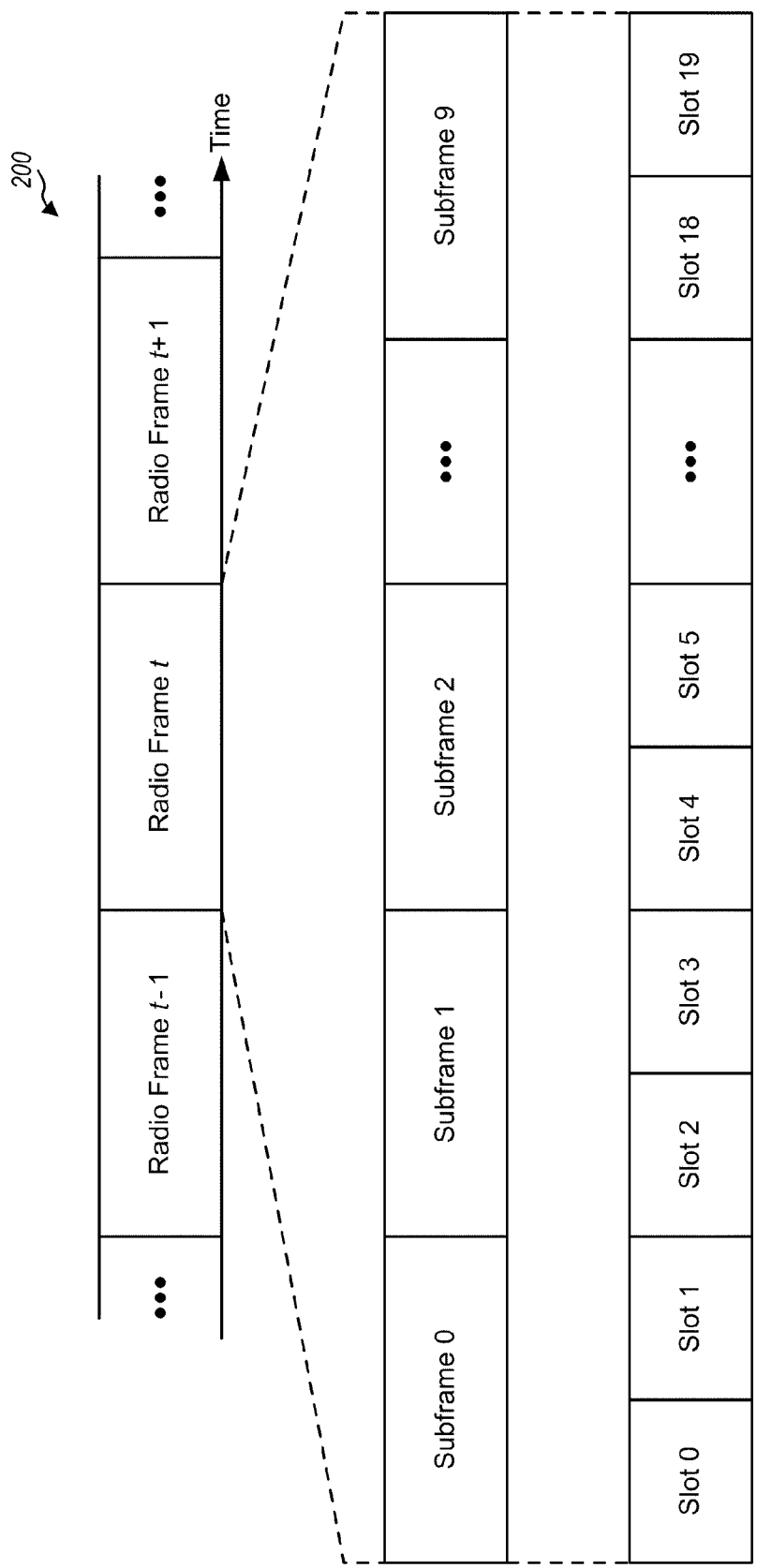
FIG. 2 shows an exemplary frame structure.

FIG. 2 shows a frame structure 200 used in LTE. The transmission timeline may be partitioned into units of radio frames. Each radio frame may have a predetermined duration (e.g., 10 milliseconds (ms)) and may be partitioned into 10 subframes with indices of 0 through 9. Each subframe may include two slots. Each radio frame may thus include 20 slots with indices of 0 to 19. Each slot may include Q symbol periods, where Q may be equal to 6 for an extended cyclic prefix or 7 for a normal cyclic prefix.

LTE utilizes orthogonal frequency division multiplexing (OFDM) on the downlink and single-carrier frequency division multiplexing (SC-FDM) on the uplink. OFDM and SC-FDM partition the system bandwidth into multiple ($N_{FFT}$) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers ($N_{FFT}$) may be dependent on the system bandwidth. For example, $N_{FFT}$ may be equal to 128, 256, 512, 1024 or 2048 for system bandwidth of 1.25, 2.5, 5, 10 or 20 MHz, respectively.

Figure 3:
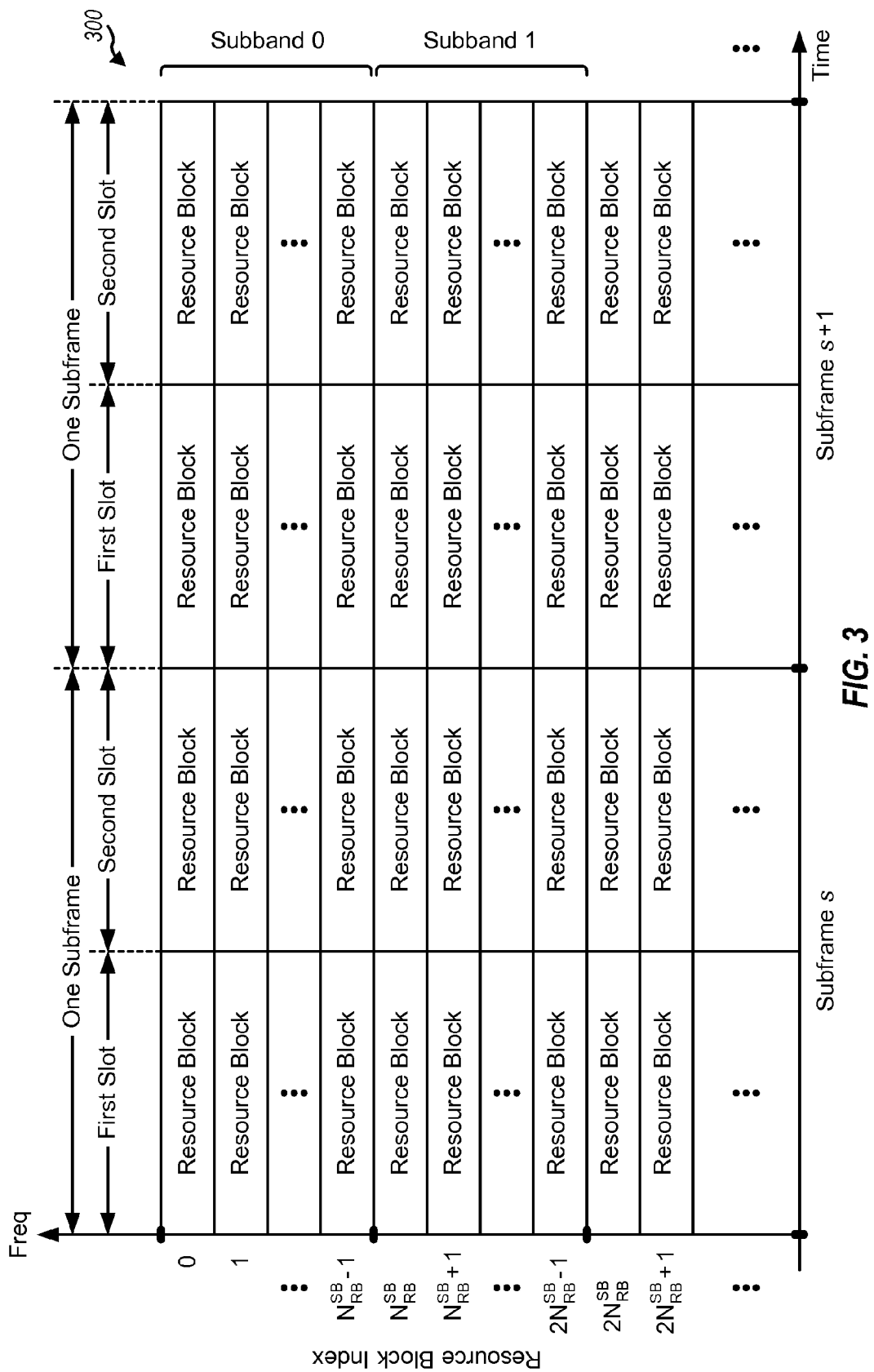
FIG. 3 shows an exemplary resource structure.

FIG. 3 shows a design of a resource structure 300 that may be used for the downlink or uplink in LTE. Multiple resource blocks may be defined in each slot with the $N_{FFT}$ total subcarriers. Each resource block may cover $N_{SC}$ subcarriers (e.g., $N_{SC}=12$ subcarriers) in one slot. The number of resource blocks in each slot may be dependent on the system bandwidth and may range from 6 to 110. The resource blocks may also be referred to as physical resource blocks (PRBs). $N_{SB}$ subbands may also be defined, where $N_{SB}$ may be dependent on the system bandwidth. Each subband may include $N_{RB}^{SB}$ PRBs.

Virtual resource blocks (VRBs) may also be defined to simplify the allocation of resources. A VRB may have the same dimension as a PRB and may cover $N_{SC}$ subcarriers in one slot in a virtual domain. A VRB may be mapped to a PRB based on a VRB-to-PRB mapping. VRBs may be allocated to the UEs, and transmissions for the UEs may be sent on PRBs to which the allocated VRBs are mapped.

In LTE, a UE may be assigned one or more VRBs for a Physical Uplink Shared Channel (PUSCH). The UE may send only data or both data and control information on the PUSCH. The UE may be configured for type 2 PUSCH hopping and may map the assigned VRBs to different PRBs in different slots or subframes. Type 2 PUSCH hopping is specified via a set of formulas, which includes a hopping function $f_{HOP}(i)$ and a mirroring function $f_M(i)$. The hopping function $f_{HOP}(i)$ selects a particular subband to use for transmission. The mirroring function $f_M(i)$ indicates whether to use PRBs in a given location of the selected subband or a mirrored location of the subband. The given location may be a distance of x from one edge of the subband, and the mirror location may be the same distance of x from the opposite edge of the subband.

The hopping function and the mirroring function may be expressed as:

$$f_{HOP}(i) = \begin{cases} 0 & N_{SB} = 1 \\ (f_{HOP}(i-1) + 1) \bmod N_{SB} & N_{SB} = 2 \\ \left[ f_{HOP}(i-1) + \left( \sum_{k=i\cdot 10+1}^{i\cdot 10+9} c(k) \times 2^{k-(i\cdot 10+1)} \right) \bmod (N_{SB} - 1) + 1 \right] \bmod N_{SB} & N_{SB} > 2 \end{cases} \quad \text{Eq (1)}$$

$$f_M(i) = \begin{cases} i \bmod 2 & N_{SB} = 1 \text{ \& intra and inter-subframe hopping} \\ \text{CURRENT\_TX\_NB} \bmod 2 & N_{SB} = 1 \text{ \& inter-subframe hopping} \\ c(i \cdot 10) & N_{SB} > 1 \end{cases} \quad \text{Eq (2)}$$

$$\text{where } i = \begin{cases} \lfloor n_S/2 \rfloor & \text{for intra and inter-subframe hopping} \\ n_S & \text{for inter-subframe hopping} \end{cases}$$

$n_S$ is an index of a slot for transmission,
$N_{SB}$ is the number of subbands, which may be provided by higher layers,
c(k) is a PN sequence,
CURRENT_TX_NB indicates a transmission number for a transport block transmitted in slot $n_S$,
"mod" denotes a modulo operation, and
"$\lfloor \rfloor$" denotes a floor operation.

For the hopping function shown in equation (1), subband hopping is not performed when there is only one subband, the hopping alternates between two subbands when there are two subbands, and the hopping hops to different subbands in a pseudo-random manner when there are more than two subbands. The PN sequence c(k) provides a 1-bit value of either '0' or '1' for a given index k. The summation term in equation (1) forms a 9-bit pseudo-random value with nine consecutive bits of the PN sequence.

Inter-subframe hopping refers to hopping from subframe to subframe and using the same PRBs in the two slots of a given subframe. Intra and inter-subframe hopping refers to hopping from subframe to subframe and also within the two slots of a given subframe. The mirroring function has a value of either '0' or '1', with '0' indicating mirroring is not used and '1' indicating mirroring is used. For the mirroring function shown in equation (2), mirroring is (i) used in every other slot for intra and inter-subframe hopping when there is only one subband, (ii) dependent on CURRENT_TX_NB for inter-subframe hopping when there is only one subband, and (iii) dependent on the PN sequence when there is more than one subband.

The PRB(s) to use for transmission in slot $n_S$ may be determined as follows:

$$\tilde{n}_{PRB}(n_S) = [\tilde{n}_{VRB} + f_{HOP}(i) N_{RB}^{SB} + \{(N_{RB}^{SB} - 1) - 2(\tilde{n}_{VRB} \bmod N_{RB}^{SB})\} f_M(i)] \bmod (N_{RB}^{SB} N_{SB}) \quad \text{Eq (3)}$$

$$\text{where } \tilde{n}_{VRB} = \begin{cases} n_{VRB} & N_{SB} = 1 \\ n_{VRB} - \lceil N_{RB}^{HO}/2 \rceil & N_{SB} > 1 \end{cases} \quad \text{Eq (4)}$$

-continued $$n_{PRB}(n_S) = \begin{cases} \tilde{n}_{PRB}(n_S) & N_{SB} = 1 \\ \tilde{n}_{PRB}(n_S) + \lceil N_{RB}^{HO}/2 \rceil & N_{SB} > 1 \end{cases} \quad \text{Eq (5)}$$

$n_{VRB}$ is a starting index of the assigned VRB(s) from a scheduling grant, $N_{RB}^{SB}$ is the number of PRBs in each subband, $N_{RB}^{HO}$ is a hopping offset provided by higher layers, and "⌈ ⌉" denotes a ceiling operation.

A UE may receive the starting index $n_{VRB}$ of one or more VRBs assigned to the UE from a scheduling grant for the UE. The UE may compute $\tilde{n}_{VRB}$ based on $n_{VRB}$, as shown in equation (4). The UE may then compute $\tilde{n}_{PRB}$ based on the hopping function, the mirroring function, and $\tilde{n}_{VRB}$, as shown in equation (3). The UE may then compute $n_{PRB}$ based on $\tilde{n}_{VRB}$, as shown in equation (5). The UE may transmit data and possibly control information on one or more PRBs starting at index $n_{PRB}$.

For type 2 PUSCH hopping, all VRBs in a given cell hop in sync. This may minimize the need to use Physical Downlink Control Channels (PDCCHs) to dynamically schedule the PUSCH for the purpose of minimizing resource fragmentation and collision in the cell.

A PN generator may be used to generate the PN sequence c(k). The PN generator may be initialized with an initial value of $c_{INIT}$ at the start of each radio frame. The initial value may be set as $c_{INIT}=N_{ID}^{CELL}$, where $N_{ID}^{CELL}$ is a cell ID of a cell. Since the cell ID is static, the same PN sequence is used in each radio frame, and the PN sequence has a periodicity of 10 ms.

Index i for the hopping function $f_{HOP}(i)$ and the mirroring function $f_M(i)$ may correspond to either slot for intra and inter-subframe hopping or subframe for inter-subframe hopping. The periodicity of the hopping and mirroring functions is fixed at one radio frame of 10 ms due to the use of the PN sequence c(k) having a periodicity of 10 ms. Index i thus ranges from 0 to 9 for inter-subframe hopping and from 0 to 19 for intra and inter-subframe hopping.

LTE supports data transmission with hybrid automatic retransmission (HARQ). For HARQ on the uplink, a UE may send a transmission of a transport block and may send one or more additional transmissions of the transport block, if needed, until the transport block is decoded correctly by an eNB, or the maximum number of transmissions has been sent, or some other termination condition is encountered. Each transmission of the transport block may be referred to as an HARQ transmission. HARQ round trip time (RTT) refers to the time interval between two consecutive HARQ transmissions of a given transport block and may be 8 ms, 10 ms, etc. LTE also supports frequency division duplexing (FDD) and time division duplexing (TDD). The operation of HARQ may be different for FDD and TDD.

For 10 ms HARQ RTT, the hopping function in equation (1) and the mirroring function in equation (2) do not hop for HARQ transmissions of the same transport block when there is more than one subband ($N_{SB}>1$). For 8 ms HARQ RTT, the hopping function in equation (1) does not hop for HARQ transmissions of the same transport block when there are two subbands ($N_{SB}=2$) due to its nature of alternating between two subbands in consecutive subframes. Performance may be degraded due to non-hopping by the hopping function with 10 ms HARQ RTT and also with 8 ms HARQ RTT and two subbands.

In an aspect, frequency hopping may be ensured for all operating scenarios by using both cell ID and system time information for the hopping function. The system time information may effectively extend the periodicity of the hopping function to be longer than the HARQ RTT. This may then allow different subbands to be selected for different HARQ transmissions of a given transport block.

In one design, the system time information may comprise an SFN of a radio frame. LTE uses a 10-bit SFN, so the radio frames are numbered from 0 through 1023, and then wrap around to 0. In general, a periodicity of any duration may be obtained for the hopping function by using an appropriate time-domain parameter for system time information. In one design, the periodicity of the hopping function may be set to match the periodicity of a Physical Broadcast Channel (PBCH) that carries the SFN as well as other system information. The PBCH has a periodicity of 40 ms or four radio frames. Two least significant bits (LSBs) of the SFN may be used as a time-domain parameter to obtain a periodicity of 40 ms for the hopping function for type 2 PUSCH hopping in LTE.

In a first frequency hopping design, the PN generator may be initialized with both the cell ID and the SFN, and the hopping function may utilize the PN sequence from the PN generator. The PN sequence c(k) in LTE may be expressed as:

$$c(k)=[x_1(k+N_C)+x_2(k+N_C)] \bmod 2, \quad \text{Eq (6)}$$

where $$x_1(k+31)=[x_1(k+3)+x_1(k)] \bmod 2, \quad \text{Eq (7)}$$

$x_2(k+31)=[x_2(k+3)+x_2(k+2)+x_2(k+1)+x(k)] \bmod 2$, and $$N_C=1600. \quad \text{Eq (8)}$$

As shown in equation (6), the PN sequence c(k) is generated based on two length-31 m-sequences $x_1(k)$ and $x_2(k)$. The $x_1(k)$ sequence may be initialized with a 31-bit value of 000 . . . 0001 and the $x_2(k)$ sequence may be initialized with a 31-bit value of $c_{INIT}$ in each radio frame. $c_{INIT}$ may be defined based on the cell ID and the SFN in various manners to obtain different initial values for the $x_2(k)$ sequence in different radio frames.

Figure 4A:
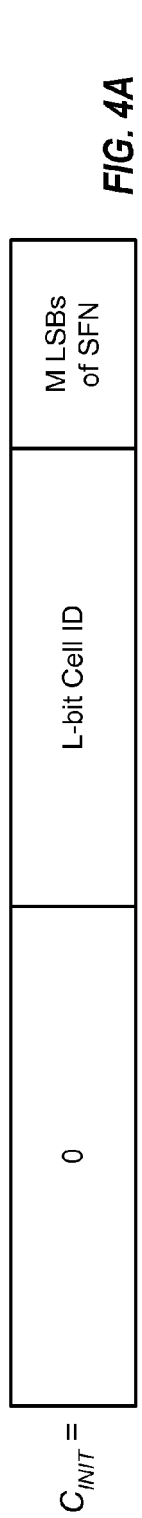
FIGS. 4A and 4B show two designs of an initial value for a PN generator.

FIG. 4A shows one design of defining $c_{INIT}$ based on cell ID and SFN. In this design, M LSBs of the SFN form M LSBs of $c_{INIT}$, an L-bit cell ID forms the next L more significant bits of $c_{INIT}$, and the remaining bits of $c_{INIT}$ are filled with zeros, where in general L≥1 and M≥1. For a case in which L=9 and M=2, $c_{INIT}$ may be expressed as:

$$c_{INIT}=4N_{ID}^{CELL}+(n_F \bmod 4), \quad \text{Eq (9)}$$

where $n_F$ is the SFN.

Equation (9) may be used to obtain a periodicity of four radio frames for the hopping function. A periodicity of K radio frames, where K may be any suitable value, may be obtained as follows:

$$c_{INIT}=KN_{ID}^{CELL}+(n_F \bmod K). \quad \text{Eq (10)}$$

Figure 4B:

FIG. 4B shows another design of defining $c_{INIT}$ based on cell ID and SFN. In this design, an L-bit cell ID forms the L LSBs of $c_{INIT}$, M LSBs of the SFN form the next M more significant bits of $c_{INIT}$ and the remaining bits of $c_{INIT}$ are filled with zeros, where in general L≥1 and M≥1. For a case in which L=9 and M=2, $c_{INIT}$ may be expressed as:

$$c_{INIT}=2^9 \cdot (n_F \bmod 4)+N_{ID}^{CELL}. \quad \text{Eq (11)}$$

A periodicity of K radio frames may be obtained as follows:

$$c_{INIT}=2^9 \cdot (n_F \bmod K)+N_{ID}^{CELL}. \quad \text{Eq (12)}$$

As shown in FIGS. 4A and 4B and equations (9) to (12), $c_{INIT}$ may be defined based on the entire cell ID, e.g., by multiplying the cell ID with a factor of four in equation (9). This may ensure that neighbor cells assigned with different cell IDs will use different PN sequences for frequency hopping.

Figure 5:
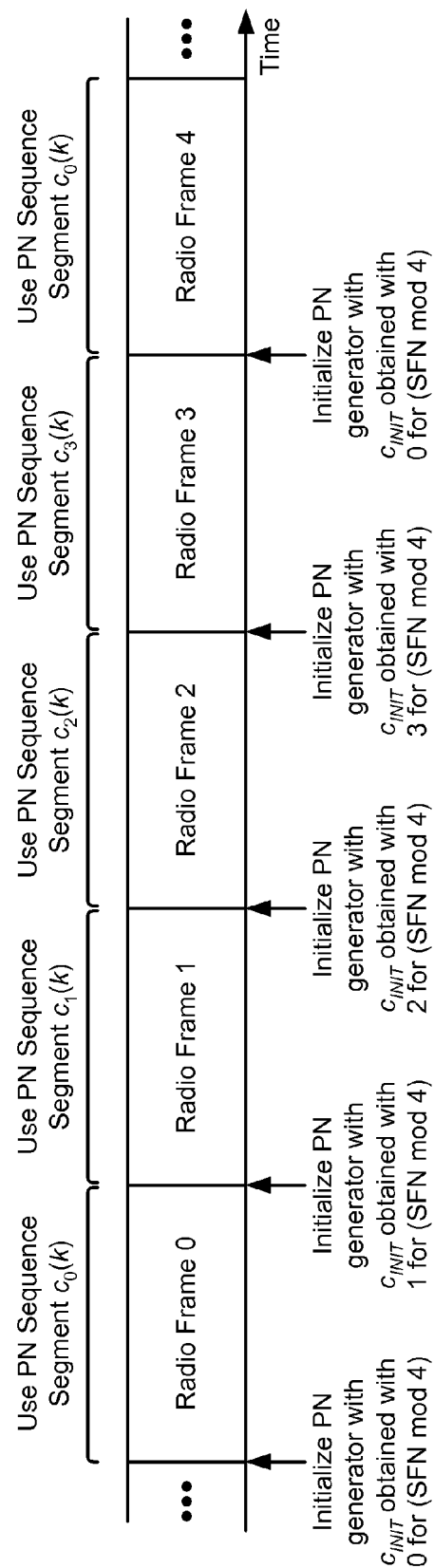
FIG. 5 shows generation of PN sequence segments for different radio frames.

FIG. 5 shows generation of the PN sequence c(k) in different radio frames based on the design shown in equation (9) or (11). Radio frame t is a radio frame with an SFN of t, where t is within a range of 0 to 1023 for a 10-bit SFN. For radio frame 0, $c_{INIT}$ is obtained with 0 for (SFN mod 4), and a PN sequence segment generated with this $c_{INIT}$ may be denoted as $c_0(k)$ and may be used in radio frame 0. For radio frame 1, $c_{INIT}$ is obtained with 1 for (SFN mod 4), and a PN sequence segment generated with this $c_{INIT}$ may be denoted as $c_1(k)$ and may be used in radio frame 1. For radio frame 2, $c_{INIT}$ is obtained with 2 for (SFN mod 4), and a PN sequence segment generated with this $c_{INIT}$ may be denoted as $c_2(k)$ and may be used in radio frame 2. For radio frame 3, $c_{INIT}$ is obtained with 3 for (SFN mod 4), and a PN sequence segment generated with this $c_{INIT}$ may be denoted as $c_3(k)$ and may be used in radio frame 3. For radio frame 4, $c_{INIT}$ is obtained with 0 for (SFN mod 4), and the PN sequence segment $c_0(k)$ is used in radio frame 4. Four different PN sequence segments $c_0(k)$, $c_1(k)$, $c_2(k)$ and $c_3(k)$ may be generated with four different values of $c_{INIT}$ and may be used for each group of four consecutive radio frames, as shown in FIG. 5. These four PN sequence segments correspond to different portions of the PN sequence c(k) defined by equation (6).

In one design, the hopping function may be defined as follows:

$$f_{HOP}(i) = \begin{cases} 0 & N_{SB} = 1 \\ \left( f_{HOP}(i-1) + \sum_{k=i\cdot 10+1}^{i\cdot 10+9} c(k) \times 2^{k-(i\cdot 10+1)} \right) \bmod N_{SB} & N_{SB} > 1 \end{cases} \quad \text{Eq (13)}$$

In equation (13), the PN sequence c(k) may be generated based on the cell ID and the SFN, as described above. The hopping function in equation (13) will hop for 10 ms HARQ RTT by using different PN sequence segments $c_0(k)$ to $c_3(k)$ in different radio frames. The hopping function will also hop for 8 ms HARQ RTT and two subbands by using the PN sequence to select a subband, instead of alternating between the two subbands in consecutive subframes.

In another design, the second part of equation (13) may be used for the case of two subbands, and the third part of equation (1) may be used for the case of more than two subbands. The hopping function may also be defined in other manners with the PN sequence c(k).

The mirroring function in equation (2) may be used with the PN sequence c(k) generated based on the cell ID and SFN. In this case, the mirroring function would be periodic over more than one radio frame and would hop for 10 ms HARQ RTT.

Figure 6:
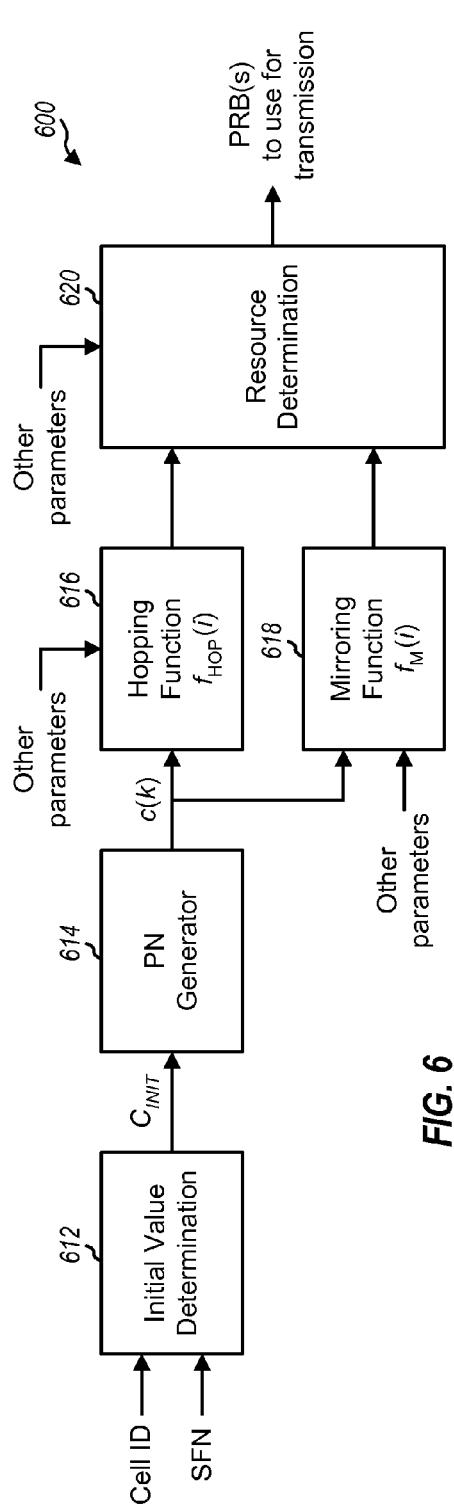
FIG. 6 shows a module to determine resources with frequency hopping.

FIG. 6 shows a design of a module 600 to determine PRBs to use for transmission based on the first frequency hopping design. A unit 612 may receive the cell ID and the SFN for a radio frame and may provide an initial value $c_{INIT}$ for the radio frame, e.g., as shown in equation (9), (10), (11) or (12). A PN generator 614 may be initialized with the initial value in each radio frame and may generate a PN sequence segment for the radio frame, e.g., as shown in equation (6). A unit 616 may receive the PN sequence segment for each radio frame and other parameters and may determine a particular subband to use for transmission based on the hopping function, e.g., as shown in equation (13). A unit 618 may also receive the PN sequence segment for each radio frame and other parameters and may determine whether or not to use mirroring based on the mirroring function, e.g., as shown in equation (2). A unit 620 may receive the subband from unit 616, an indication of whether or not to use mirroring from unit 618, and other parameters. Unit 620 may determine the PRB(s) to use for transmission based on all of the inputs, e.g., as shown in equations (3) to (5).

For the first frequency hopping design, different segments of the PN sequence c(k) may be generated in different radio frames with different values of $c_{INIT}$. These different PN sequence segments may be used in the hopping function and the mirroring function to obtain a longer periodicity. The PN sequence segment for each radio frame may be generated on the fly at the start of the radio frame. Alternatively, the PN sequence segments may be pre-computed, stored in a look-up table, and accessed as needed.

In a second frequency hopping design, the PN generator may be initialized with only the cell ID, and the hopping function and the mirroring function may utilize the PN sequence from the PN generator as well as an offset determined by the SFN. In this design, the same PN sequence c(k) may be generated in each radio frame with the same value of $c_{INIT}$, e.g., $c_{INIT} = N_{ID}^{CELL}$. A longer periodicity may be obtained for the hopping and mirroring functions by using different offsets of the PN sequence in different radio frames. In one design, the hopping and mirroring functions may be defined as follows:

$$f_{HOP}(i) = \begin{cases} 0 & N_{SB} = 1 \\ \left( f_{HOP}(i-1) + \sum_{k=i\cdot 10+1}^{i\cdot 10+9} c(k + n_F \bmod K) \times 2^{k-(i\cdot 10+1)} \right) \bmod N_{SB} & N_{SB} > 1 \end{cases} \quad \text{Eq (14)}$$

$$f_M(i) = \begin{cases} i \bmod 2 & N_{SB} = 1 \text{ \& intra and inter-subframe hopping} \\ \text{CURRENT\_TX\_NB} \bmod 2 & N_{SB} = 1 \text{ \& inter-subframe hopping} \\ c(i \cdot 10 + n_F \bmod K) & N_{SB} > 1 \end{cases} \quad \text{Eq (15)}$$

where $n_F \bmod K$ is an offset that may be different for different radio frames, and $K \geq 1$ is the desired periodicity in number of radio frames, e.g., K=4.

The design in equation (14) uses overlapping PN bits for the summation term in the second part. In particular, ten PN bits c(k) to c(k+9) may be used in the summation for radio frame 0, ten PN bits c(k+1) to c(k+10) may be used in the summation for radio frame 1, ten PN bits c(k+2) to c(k+11) may be used in the summation for radio frame 2, etc. To avoid overlapping PN bits in the summation, the hopping function may be defined as follows:

$$f_{HOP}(i) = \quad \text{Eq (16)}$$

$$\begin{cases} 0 & N_{SB} = 1 \\ \left( f_{HOP}(i-1) + \sum_{k=i\cdot 10\cdot K+1}^{i\cdot 10\cdot K+9} c(k + 10(n_F \bmod K)) \times 2^{k-(i\cdot 10\cdot K+1)} \right) \bmod N_{SB} & N_{SB} > 1 \end{cases}$$

If K=4, then equation (16) may be expressed as:

$$f_{HOP}(i) = \begin{cases} 0 & N_{SB} = 1 \\ \left(f_{HOP}(i-1) + \sum_{k=i\cdot40+1}^{i\cdot40+9} c(k + 10(n_F \bmod 4)) \times 2^{k-(i\cdot40+1)}\right) \bmod N_{SB} & N_{SB} > 1 \end{cases} \quad \text{Eq (17)}$$

The hopping function and the mirroring function may also be defined in other manners using an offset of the PN sequence c(k). The use of the offset allows the PN sequence to be generated once for all radio frames.

Figure 7:
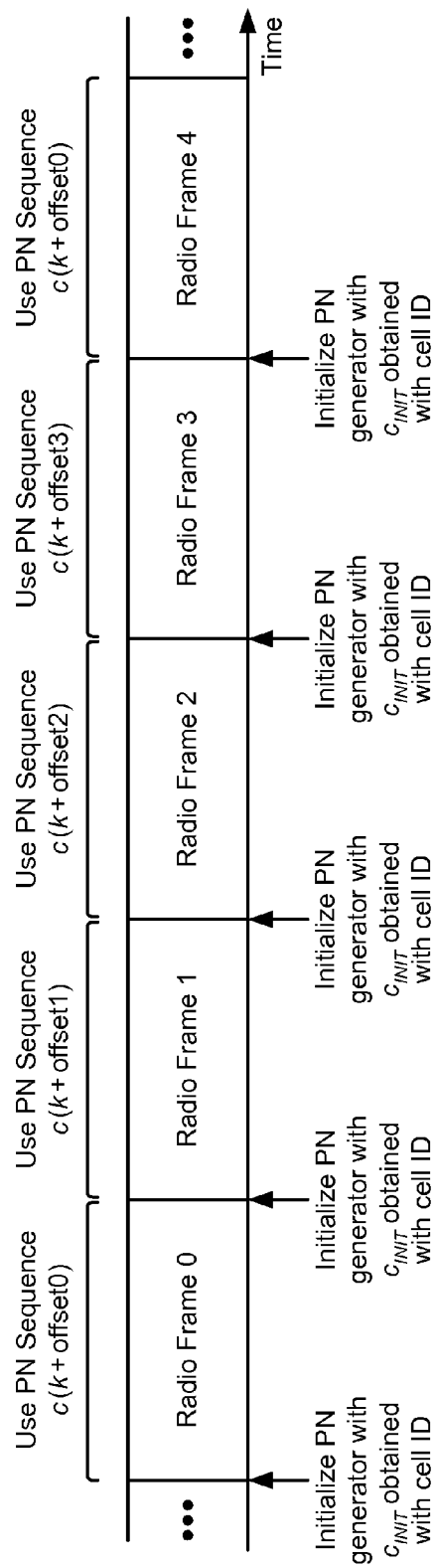
FIG. 7 shows use of different PN offsets in different radio frames.

FIG. 7 shows use of different offsets for the PN sequence c(k) in different radio frames based on the design shown in equation (14), (16) or (17). The same PN sequence c(k) may be used in each radio frame. An offset of offset0 may be used for the PN sequence in radio frame 0, an offset of offset1 may be used for the PN sequence in radio frame 1, an offset of offset2 may be used for the PN sequence in radio frame 2, an offset of offset3 may be used for the PN sequence in radio frame 3, an offset of offset0 may be used for the PN sequence in radio frame 4, etc. The periodicity of the hopping and mirroring functions may be extended by using different offsets in different radio frames.

In general, system time information (e.g., SFN) may be used either as an offset in the initialization of the PN generator to generate different PN sequence segments or as an offset for the same PN sequence. In either case, the offset may be selected such that (i) adjacent cells will not collide with the same PN sequence and/or (ii) adjacent subframes or slots will not collide with the same portion of the same PN sequence. The system time information may also be used in other manners to extend the periodicity of the hopping and mirroring functions.

The first and second frequency hopping designs described above may have the following advantages:
 The periodicity of the hopping and mirroring functions may be extended, e.g., to 40 ms by using SFN dependent offset of 0, 1, 2 and 3,
 All VRBs in a given cell hop in sync,
 eNB and UEs are likely to be in-sync for the hopping and mirroring functions since the UEs are required to acquire the SFN from the eNB,
 Hopping is ensured for 8 ms and 10 ms HARQ RTT and for both FDD and TDD,
 The new hopping and mirroring functions should be as simple to implement as the original hopping and mirroring functions in equations (1) and (2), and
 Impact on LTE specs may be minimal.

A UE typically has knowledge of the SFN of a serving cell and can then perform type 2 PUSCH hopping, as described above. The UE may not have knowledge of the SFN in some scenarios, e.g., upon handover to a new cell, upon re-accessing a cell after being out-of-sync with uplink timing, etc. In each of these scenarios, the UE may perform a random access procedure to access the cell. For the random access procedure, the UE may send a random access preamble (or Message 1) on a Random Access Channel (RACH), receive a random access response (RAR) (or Message 2) with an RAR grant from the cell, and send a scheduled transmission (or Message 3) on the PUSCH in accordance with the RAR grant. The UE may not successfully decode the PBCH and may not acquire the SFN in time for transmission of Message 3 on the PUSCH. The probability of such an event may be very low since the SFN is transmitted every 10 ms. Furthermore, it may be safe to assume that the UE will acquire the SFN after the RACH procedure and can perform type 2 PUSCH hopping for subsequent PUSCH transmissions.

The potential issue of SFN being temporarily unavailable to the UE during the random access procedure (e.g., for handover and re-sync) may be addressed in various manners. In one design, which may be referred to as Alternative I, Message 3 and other transmissions on the PUSCH may be delayed until the SFN is acquired by the UE. Medium Access Control (MAC) at the UE may consider the random access attempt as unsuccessful even if a Message 2 was received from the cell. The UE may then proceed with a re-try procedure (e.g., re-try with Message 2 or repeat the random access procedure). This will delay the random access procedure. However, since this is a low probability event, overall performance may be negligibly impacted. Furthermore, this behavior may be limited to the case where the UE receives an RAR grant (or a grant via downlink control information (DCI) format 0) with type 2 PUSCH hopping enabled. From the UE perspective, if the UE receives an RAR grant (or a grant via DCI format 0) with type 2 PUSCH hopping enabled but has not yet acquired the SFN, then the UE may treat it as an invalid uplink assignment and may not transmit the PUSCH with type 2 PUSCH hopping. The eNB may decide whether to use type 2 PUSCH hopping for this case or not.

In another design, which may be referred to as Alternative II, the SFN may be assumed to be acquired by the UE after the random access procedure, if not earlier. One or more of the following options may then be used:
 Option 1: Do not specify anything in the LTE standard. The eNB implementation may enable or disable type 2 PUSCH hopping in DCI format 0 for Message 3.
 Option 2: For Message 3 transmission, disable type 2 PUSCH hopping, where the corresponding bit(s) in the DCI format 0 can be reserved. This requires minimal standard changes and eliminates the need to handle this rare error event.
 Option 3: For Message 3 transmission, assume SFN=0. When SFN=0, hopping is effectively disabled for 10 ms HARQ RTT, but may be enabled using the designs described above.
 Option 4: The UE may set SFN=0 when it receives Message 2 and may thereafter increment SFN by one for every 10 ms until after successful Message 3 transmission. The type 2 PUSCH hopping in this case may be UE-specific instead of cell-specific, and the PUSCH hopping for Message 3 may not be in sync with other PUSCH transmissions.
 Option 5: Introduce one bit in DCI format 0 to indicate whether or not the SFN should be reset for the purpose of type 2 PUSCH hopping. For example, if the bit is set to 0, then the UE may use the current SFN, if available, in the functions described above. Otherwise, the UE may assume SFN=0.
 Option 6: Introduce a threshold-dependent SFN reset. For example, if the assignment size is larger than a certain threshold, then the SFN may be reset to 0. The impact on uplink interference due to erroneous PUSCH transmissions may be limited with this option.

For the options described above, the handling of Message 3 may be classified as two possibilities as follows:
 M1: Only messages subject to potential SFN confusion, e.g., handover, re-sync, and
 M2: All messages regardless of SFN confusion or not.

Type 2 PUSCH hopping may also be classified as two possibilities:

H1: All type 2 PUSCH hopping with $N_{SB} \geq 2$, and

H2: All type 2 PUSCH hopping regarding of $N_{SB}$. That is, even for $N_{SB}=1$, the designs described above may apply.

Alternative II, option 2 may be interpreted as being applicable in the following scenarios:

M1+H1: Disable type 2 PUSCH hopping with $N_{SB} \geq 2$ for Message 3 subject to potential SFN confusion, M2+H1: Disable type 2 PUSCH hopping with $N_{SB} \geq 2$ for Message 3 regardless of SFN confusion or not, M1+H2: Disable type 2 PUSCH hopping, regardless of $N_{SB}$, for Message 3 subject to potential SFN confusion, and M2+H2: Disable type 2 PUSCH hopping, regarding of $N_{SB}$, for Message 3, regardless of SFN confusion or not.

Alternative II, option 3 may be interpreted as applicable in the following scenarios:

M1+H1, M2+H1, M1+H2, and M2+H2.

A similar concept applies to the other options described above. If SFN confusion exists for PUSCH transmission (e.g., the UE has not acquired SFN after the random access procedure upon handover), then the same options may be applicable.

An alternative to type 2 PUSCH hopping is to utilize the CURRENT_TX_NB, which indicates the total number of HARQ transmissions for a given transport block. There are two disadvantages with using this attribute for type 2 PUSCH hopping. First, the eNB and the UE may be out-of-sync in terms of the CURRENT_TX_NB. Thus, the UE may use some erroneous PRBs for PUSCH transmission and may interfere with other PUSCH transmissions. Second, type 2 PUSCH hopping in the cell will be UE-specific since the CURRENT_TX_NB is a UE-specific parameter. This UE-specific parameter may force the eNB to use dynamic scheduling in order to reduce resource fragmentation. Option 5 and/or option 6 described above may be used to solve the potential out-of-sync issue.

In another design, a default mode may be defined instead of disabling type 2 PUSCH hopping for Message 3 transmission. One default mode may set $N_{SB}=1$, since it does not depend on SFN. In particular, when a UE receives an uplink assignment for Message 3 transmission with type 2 PUSCH hopping, the UE may treat it as $N_{SB}=1$ regardless of the actual $N_{SB}$ configuration of the cell. This may be similar to a default mode of SFN=0 operation for $N_{SB}=2$, as proposed for one of the options listed above. Message 3 transmission in the default mode may mean either the M1 or M2 possibilities listed above.

Figure 8:
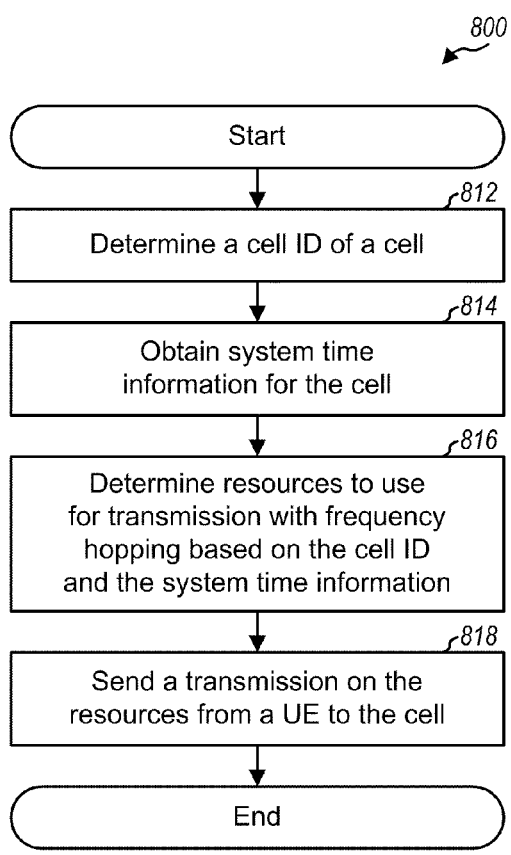
FIG. 8 shows a process for communicating with frequency hopping.

FIG. 8 shows a design of a process 800 for communicating with frequency hopping in a wireless communication network. Process 800 may be performed by a UE, a base station/eNB, or some other entity. A cell ID of a cell may be determined (block 812). System time information for the cell may be obtained (block 814). In one design, the system time information may comprise an SFN of a radio frame. The system time information may also comprise other information related to system time for the cell. Resources to use for transmission with frequency hopping may be determined based on the cell ID and the system time information (block 816). In one design, which is shown in FIG. 8, a UE may perform process 800 and may send a transmission on the resources to the cell (block 818). In another design, which is not shown in FIG. 8, a base station may perform process 800 and may receive a transmission sent on the resources by a UE to the cell.

In one design of block 816, a PN generator may be initialized based on the cell ID and the system time information. A PN sequence may be generated with the PN generator. The resources to use for transmission may then be determined based on the PN sequence. In one design of initializing the PN generator, an initial value (e.g., $c_{INIT}$) for the PN generator in each radio frame may be determined based on the cell ID and the SFN for that radio frame, e.g., as shown in equation (9), (10), (11) or (12). The initial value may comprise L bits for the cell ID and M bits for M LSBs of the SFN, where L and M may each be one or greater, e.g., as shown in FIG. 4A or 4B. The PN generator may then be initialized in each radio frame with the initial value for that radio frame. In another design, the PN generator may be initialized in each radio frame with an initial value determined based solely on the cell ID, e.g., initial value=cell ID.

In one design of block 816, a PN sequence may be generated in each radio frame based on the cell ID and the SFN. A particular subband to use for transmission may be determined based on a hopping function and the PN sequence, e.g., as shown in equation (13). Whether or not to use mirroring may be determined based on a mirroring function and the PN sequence, e.g., as shown in equation (2). The resources to use for transmission may be determined based on the particular subband and whether or not to use mirroring, e.g., as shown in equation (3). The PN sequence may be generated in each radio frame based on at least one bit (e.g., two LSBs) of the SFN. The hopping function and the mirroring function may have a periodicity of at least two (e.g., four) radio frames, even though the PN generator is initialized in each radio frame.

In another design of block 816, a PN sequence may be generated in each radio frame based on the cell ID. An offset for each radio frame may be determined based on the SFN. For example, the offset may be ($n_F$ mod K), $10(n_F$ mod K), etc. A subband to use for transmission may be determined based on a hopping function, the PN sequence, and the offset, e.g., as shown in equation (14), (15), (16) or (17). Whether or not to use mirroring may also be determined based on a mirroring function, the PN sequence, and the offset, e.g., as shown in equation (15). The resources to use for transmission may be determined based on the particular subband and whether or not to use mirroring.

A UE may perform process 800 and may obtain the system time information from a broadcast channel sent by the cell. The UE may avoid transmission with frequency hopping if the system time information is not available, or during a random access procedure, and/or under other scenarios. The UE may receive an assignment with frequency hopping and may treat the assignment as invalid if the system time information is not available. The UE may also use a default value for the system time information or a default number of subbands for the hopping function if the system time information is not available.

In one design for LTE, the UE may obtain an assignment of at least one VRB from the cell. The UE may map the at least one VRB to at least one PRB based on the hopping function and the PN sequence generated based on the cell ID and the system time information. The UE may send a transmission on the at least one PRB for the PUSCH to the cell. The UE may also send a transmission in other manners for other wireless networks.

Figure 9:
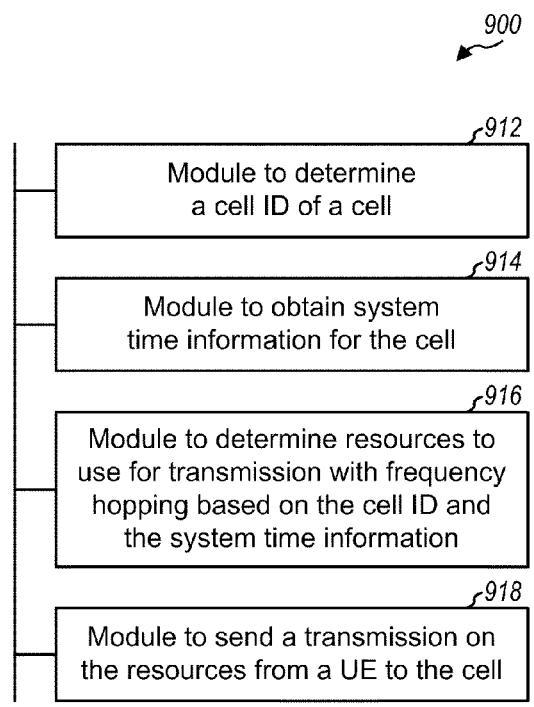
FIG. 9 shows an apparatus for communicating with frequency hopping.

FIG. 9 shows a design of an apparatus 900 for communicating with frequency hopping in a wireless communication network. Apparatus 900 includes a module 912 to determine a cell ID of a cell, a module 914 to obtain system time information for the cell, and a module 916 to determine resources to use for transmission with frequency hopping based on the cell ID and the system time information. In one design that is shown in FIG. 9, the apparatus may be for a UE and may further include a module 918 to send a transmission on the resources from the UE to the cell. In another design that is not shown in FIG. 9, the apparatus may be for a base station/eNB and may further include a module to receive a transmission sent on the resources by a UE to the cell The modules in FIG. 9 may comprise processors, electronic devices, hardware devices, electronic components, logical circuits, memories, software codes, firmware codes, etc., or any combination thereof.

Figure 10:
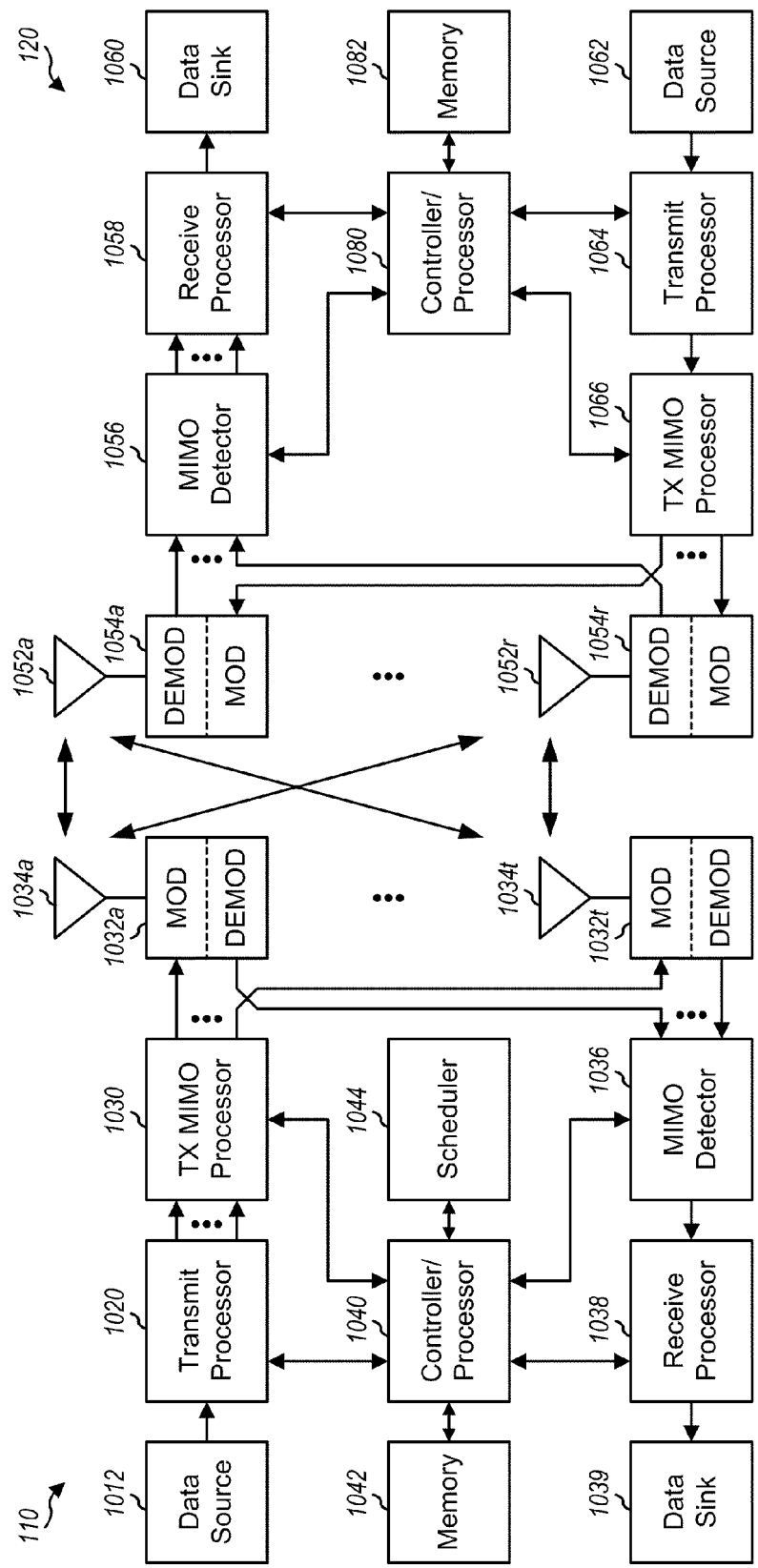
FIG. 10 shows a block diagram of a base station and a UE.

FIG. 10 shows a block diagram of a design of an eNB/base station 110 and a UE 120, which may be one of the eNBs and one of the UEs in FIG. 1. eNB 110 may be equipped with T antennas 1034a through 1034t, and UE 120 may be equipped with R antennas 1052a through 1052r, where in general T≥1 and R≥1.

At eNB 110, a transmit processor 1020 may receive data for one or more UEs from a data source 1012, process (e.g., encode, interleave, and modulate) the data for each UE based on one or more modulation and coding schemes for that UE, and provide data symbols for all UEs. Transmit processor 1020 may also process control information (e.g., cell ID, SFN, assignments, etc.) from a controller/processor 1040 and provide control symbols. A transmit (TX) multiple-input multiple-output (MIMO) processor 1030 may multiplex the data symbols, the control symbols, and/or pilot symbols. TX MIMO processor 1030 may perform spatial processing (e.g., precoding) on the multiplexed symbols, if applicable, and provide T output symbol streams to T modulators (MODs) 1032a through 1032t. Each modulator 1032 may process a respective output symbol stream (e.g., for OFDM) to obtain an output sample stream. Each modulator 1032 may further process (e.g., convert to analog, amplify, filter, and upconvert) the output sample stream to obtain a downlink signal. T downlink signals from modulators 1032a through 1032t may be transmitted via T antennas 1034a through 1034t, respectively.

At UE 120, antennas 1052a through 1052r may receive the downlink signals from eNB 110 and provide received signals to demodulators (DEMODs) 1054a through 1054r, respectively. Each demodulator 1054 may condition (e.g., filter, amplify, downconvert, and digitize) a respective received signal to obtain received samples. Each demodulator 1054 may further process the received samples (e.g., for OFDM) to obtain received symbols. A MIMO detector 1056 may obtain received symbols from all R demodulators 1054a through 1054r, perform MIMO detection on the received symbols if applicable, and provide detected symbols. A receive processor 1058 may process (e.g., demodulate, deinterleave, and decode) the detected symbols, provide decoded control information (e.g., cell ID, SFN, assignments, etc.) to a controller/processor 1080, and provide decoded data for UE 120 to a data sink 1060.

On the uplink, at UE 120, data from a data source 1062 and control information from controller/processor 1080 may be processed by a transmit processor 1064, which may perform frequency hopping as described above. The symbols from transmit processor 1064 may be precoded by a TX MIMO processor 1066 if applicable, conditioned by modulators 1054a through 1054r, and transmitted to eNB 110. At eNB 110, the uplink signals from UE 120 may be received by antennas 1034, conditioned by demodulators 1032, processed by a MIMO detector 1036 if applicable, and further processed by a receive processor 1038 to obtain the data and control information transmitted by UE 120.

Controllers/processors 1040 and 1080 may direct the operation at eNB 110 and UE 120, respectively. Processor 1064, processor 1080 and/or other processors and modules at UE 120 may implement module 600 in FIG. 6 and/or implement process 800 in FIG. 8 for data transmission with frequency hopping on the uplink. Processor 1038, processor 1040 and/or other processors and modules at eNB 110 may also implement module 600 in FIG. 6 and/or implement process 800 in FIG. 8 for data reception with frequency hopping on the uplink. Data transmission and data reception with frequency hopping on the downlink may be performed in a manner similar to, or different from, data transmission and data reception with frequency hopping on the uplink. Memories 1042 and 1082 may store data and program codes for eNB 110 and UE 120, respectively. A scheduler 1044 may schedule UEs for downlink and/or uplink transmission and may provide assignments of resources (e.g., VRBs) for the scheduled UEs.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method implemented in an apparatus for use in a wireless communication system, the method comprising:
    determining, via the apparatus, a cell identity (ID) of a cell;
    obtaining, via the apparatus, system time information for the cell; and
    determining, via the apparatus, resource blocks to use for transmission with frequency hopping, the resource blocks determined based on the cell ID and the system time information, each resource block having a predetermined number of subcarriers in a predetermined time interval;
    wherein the determining the resource blocks to use for transmission comprises:
    initializing a pseudo-random sequence generator based on the cell ID and the system time information,
    generating a pseudo-random sequence with the pseudo-random sequence generator, and
    determining the resource blocks to use for transmission based on the pseudo-random sequence.

2. The method of claim 1, further comprising:
    sending a transmission on the resource blocks from a user equipment (UE) to the cell.

3. The method of claim 2, wherein the determining the resource blocks to use for transmission comprises:
    obtaining an assignment of at least one virtual resource block (VRB) from the cell, and
    mapping the at least one VRB to at least one physical resource block (PRB) based on a hopping function and a pseudo-random sequence generated based on the cell ID and the system time information, and wherein the sending a transmission on the resource blocks comprises sending a transmission on the at least one PRB for a Physical Uplink Shared Channel (PUSCH) from the UE to the cell.

4. The method of claim 1, further comprising:
    receiving a transmission sent on the resource blocks by a user equipment (UE) to the cell.

5. The method of claim 1, wherein the system time information comprises
    system frame number (SFN), and wherein the initializing the pseudo-random sequence generator comprises:
    determining an initial value for the pseudo-random sequence generator in each radio frame based on the cell ID and the SFN for the radio frame, and
    initializing the pseudo-random sequence generator in each radio frame with the initial value for the radio frame.

6. The method of claim 5, wherein the initial value for the pseudo-random sequence generator in each radio frame comprises L bits for the cell ID and M bits for M least significant bits (LSBs) of the SFN, where L and M are each one or greater.

7. The method of claim 1, wherein the system time information comprises a system frame number (SFN), and wherein the determining the resource blocks to use for transmission comprises:
    generating a pseudo-random sequence in each radio frame based on the cell ID and the SFN,
    determining a subband to use for transmission based on a hopping function and the pseudo-random sequence, and
    determining the resource blocks to use for transmission based on the subband.

8. The method of claim 7, wherein the pseudo-random sequence is generated in each radio frame based on at least one bit of the SFN, and wherein the hopping function has a periodicity of at least two radio frames.

9. The method of claim 7, wherein the pseudo-random sequence is generated in each radio frame based on two least significant bits (LSBs) of the SFN, and wherein the hopping function has a periodicity of four radio frames.

10. The method of claim 7, further comprising:
    using a default value for the SFN or a default number of subbands for the hopping function if the SFN is not available.

11. The method of claim 5, wherein the determining the resource blocks to use for transmission further comprises:
    determining whether to use mirroring based on a mirroring function and the pseudo-random sequence, and
    determining the resource blocks to use for transmission based further on whether to use mirroring.

12. The method of claim 1, wherein the system time information comprises a system frame number (SFN), and wherein the determining the resource blocks to use for transmission comprises:
    generating a pseudo-random sequence in each radio frame based on the cell ID, determining an offset for each radio frame based on the SFN,
determining a subband to use for transmission based on a hopping function, the pseudo-random sequence, and the offset, and
determining the resource blocks to use for transmission based on the subband.

13. The method of claim 12, wherein the determining the resource blocks to use for transmission further comprises:
determining whether to use mirroring based on a mirroring function, the pseudo-random sequence, and the offset, and
determining the resource blocks to use for transmission based further on whether to use mirroring.

14. The method of claim 1, further comprising:
obtaining the system time information from a broadcast channel sent by the cell.

15. The method of claim 1, further comprising:
not transmitting with frequency hopping if the system time information is not available.

16. The method of claim 1, further comprising:
not transmitting with frequency hopping during a random access procedure.

17. The method of claim 1, further comprising:
receiving an assignment with frequency hopping; and
treating the assignment as invalid if the system time information is not available.

18. An apparatus for wireless communication, comprising:
means for determining a cell identity (ID) of a cell; means for obtaining system time information for the cell;
means for determining resource blocks to use for transmission with frequency hopping, the resource blocks determined based on the cell ID and the system time information, each resource block having a predetermined number of subcarriers in a predetermined time interval; and
means for sending a transmission on the resource blocks from a user equipment (UE) to the cell;
wherein the means for determining the resource blocks to use for transmission comprises:
means for initializing a pseudo-random sequence generator based on the cell ID and the system time information,
means for generating a pseudo-random sequence with the pseudo-random sequence generator, and
means for determining the resource blocks to use for transmission based on the pseudo-random sequence.

19. The apparatus of claim 18, wherein the system time information comprises a system frame number (SFN), and wherein the means for determining the resource blocks to use for transmission comprises:
means for determining an initial value for a pseudo-random sequence generator in each radio frame based on the cell ID and the SFN for the radio frame,
means for initializing the pseudo-random sequence generator in each radio frame with the initial value for the radio frame,
means for generating a pseudo-random sequence in each radio frame with the pseudo-random sequence generator, and
means for determining the resource blocks to use for transmission in each radio frame based on the pseudo-random sequence for the radio frame.

20. The apparatus of claim 18, wherein the system time information comprises a system frame number (SFN), and wherein the means for determining the resource blocks to use for transmission comprises:
means for generating a pseudo-random sequence in each radio frame based on the cell ID and the SFN,
means for determining a subband to use for transmission based on a hopping function and the pseudo-random sequence, and
means for determining the resource blocks to use for transmission based on the subband.

21. The apparatus of claim 20, wherein the means for determining the resource blocks to use for transmission further comprises:
means for determining whether to use mirroring based on a mirroring function and the pseudo-random sequence, and
means for determining the resource blocks to use for transmission based further on whether to use mirroring.

22. The apparatus of claim 20, wherein the pseudo-random sequence is generated in each radio frame based on two least significant bits (LSBs) of the SFN, and wherein the hopping function has a periodicity of four radio frames.

23. The apparatus of claim 18, further comprising:
means for obtaining the system time information from a broadcast channel sent by the cell.

24. The apparatus of claim 18, wherein the means for determining the resource blocks to use for transmission comprises:
means for obtaining an assignment of at least one virtual resource block (VRB) from the cell, and
means for mapping the at least one VRB to at least one physical resource block (PRB) based on a hopping function and a pseudo-random sequence generated based on the cell ID and the system time information, and wherein the means for sending a transmission on the resource blocks comprises means for sending a transmission on the at least one PRB for a Physical Uplink Shared Channel (PUSCH) from the UE to the cell.

25. The apparatus of claim 18, wherein the means for determining the resource blocks to use for transmission comprises:
means for determining a pseudo-random sequence based on the cell ID and the system time information, and
means for determining the resource blocks to use for transmission based on an overall function comprising a hopping function and a mirroring function, the hopping function and the mirroring function being based on the pseudo-random sequence.

26. The apparatus of claim 25, further comprising:
means for initializing a pseudo-random sequence generator, used to generate the pseudo-random sequence, based on a function $$c_{init}=2^9 \cdot (n_f \bmod 4)+N_{ID}^{cell},$$

where $N_{ID}^{cell}$ denotes the cell ID,
$n_f$ denotes a system frame number for the system time information,
$c_{init}$ denotes a seed value for the pseudo-random sequence generator, and
mod denotes a modulo operation.

27. An apparatus for wireless communication, comprising:
at least one processor configured to determine a cell identity (ID) of a cell, to obtain system time information for the cell, to determine resource blocks to use for transmission with frequency hopping, the resource blocks determined based on the cell ID and the system time information, each resource block having a predetermined number of subcarriers in a predetermined time interval, and to send a transmission on the resource blocks from a user equipment (UE) to the cell;

wherein the at least one processor is configured to initialize a pseudo-random sequence generator based on the cell ID and the system time information, to generate a pseudo-random sequence with the pseudo-random sequence generator, and to determine the resource blocks to use for transmission based on the pseudo-random sequence.

28. The apparatus of claim 27, wherein the system time information comprises a system frame number (SFN), and wherein the at least one processor is configured to determine an initial value for a pseudo-random sequence generator in each radio frame based on the cell ID and the SFN for the radio frame, to initialize the pseudo-random sequence generator in each radio frame with the initial value for the radio frame, to generate a pseudo-random sequence in each radio frame with the pseudo-random sequence generator, and to determine the resource blocks to use for transmission in each radio frame based on the pseudo-random sequence for the radio frame.

29. The apparatus of claim 27, wherein the system time information comprises a system frame number (SFN), and wherein the at least one processor is configured to generate a pseudo-random sequence in each radio frame based on the cell ID and the SFN, to determine a subband to use for transmission based on a hopping function and the pseudo-random sequence, and to determine the resource blocks to use for transmission based on the subband.

30. The apparatus of claim 29, wherein the at least one processor is configured to determine whether to use mirroring based on a mirroring function and the pseudo-random sequence, and to determine the resource blocks to use for transmission based further on whether to use mirroring.

31. The apparatus of claim 29, wherein the pseudo-random sequence is generated in each radio frame based on two least significant bits (LSBs) of the SFN, and wherein the hopping function has a periodicity of four radio frames.

32. The apparatus of claim 27, wherein the at least one processor is configured to obtain the system time information from a broadcast channel sent by the cell.

33. The apparatus of claim 27, wherein the at least one processor is configured to obtain an assignment of at least one virtual resource block (VRB) from the cell, to map the at least one VRB to at least one physical resource block (PRB) based on a hopping function and a pseudo-random sequence generated based on the cell ID and the system time information, and to send a transmission on the at least one PRB for a Physical Uplink Shared Channel (PUSCH) from the UE to the cell.

34. The apparatus of claim 27, wherein the at least one processor is configured to determine a pseudo-random sequence based on the cell ID and the system time information, and to determine the resource blocks to use for transmission based on an overall function comprising a hopping function and a mirroring function, the hopping function and the mirroring function being based on the pseudo-random sequence.

35. The apparatus of claim 34, wherein the at least one processor is configured to initialize a pseudo-random sequence generator, used to generate the pseudo-random sequence, based on a function $$c_{init}=2^9 \cdot (n_f \bmod 4)+N_{ID}^{cell},$$

where $N_{ID}^{cell}$ denotes the cell ID, $n_f$ denotes a system frame number for the system time information, $c_{init}$ denotes a seed value for the pseudo-random sequence generator, and mod denotes a modulo operation.

36. A non-transitory computer-readable medium comprising:
code for causing at least one computer to determine a cell identity (ID) of a cell,
code for causing the of least one computer to obtain system time information for the cell,
code for causing the at least one computer to determine resource blocks to use for transmission with frequency hopping, the resource blocks determined based on the cell ID and the system time information, each resource block having a predetermined number of subcarriers in a predetermined time interval, and
code for causing the at least one computer to send a transmission on the resource blocks from a user equipment (UE) to the cell;
wherein the determining the resource blocks to use for transmission comprises:
code for causing the at least one computer to initialize a pseudo-random sequence generator based on the cell ID and the system time information,
code for causing the at least one computer to generate a pseudo-random sequence with the pseudo-random sequence generator, and
code for causing the at least one computer to determine the resource blocks to use for transmission based on the pseudo-random sequence.

37. The method of claim 1, wherein the determining the resource blocks to use for transmission comprises:
determining a pseudo-random sequence based on the cell ID and the system time information, and
determining the resource blocks to use for transmission based on an overall function comprising a hopping function and a mirroring function, the hopping function and the mirroring function being based on the pseudo-random sequence.

38. The method of claim 37, further comprising:
initializing a pseudo-random sequence generator, used to generate the pseudo-random sequence, based on a function $$c_{init}=2^9 \cdot (n_f \bmod 4)+N_{ID}^{cell},$$

where $N_{ID}^{cell}$ denotes the cell ID, $n_f$ denotes a system frame number for the system time information, $c_{init}$ denotes a seed value for the pseudo-random sequence generator, and mod denotes a modulo operation.

* * * * *